US012669570B2

(12) United States Patent
Chishima et al.

(10) Patent No.: US 12,669,570 B2
(45) Date of Patent: Jun. 30, 2026

(54) ALLOCATION DETERMINATION APPARATUS, ALLOCATION DETERMINATION METHOD, AND COMPUTER-READABLE MEDIUM

(71) Applicant: NEC Corporation, Tokyo (JP)

(72) Inventors: Hiroshi Chishima, Tokyo (JP); Yuki Susa, Tokyo (JP); Masanori Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 518 days.

(21) Appl. No.: 18/032,884

(22) PCT Filed: Oct. 29, 2020

(86) PCT No.: PCT/JP2020/040623
§ 371 (c)(1),
(2) Date: Apr. 20, 2023

(87) PCT Pub. No.: WO2022/091293
PCT Pub. Date: May 5, 2022

(65) Prior Publication Data
US 2023/0288527 A1      Sep. 14, 2023

(51) Int. Cl.
G01S 5/02          (2010.01)
(52) U.S. Cl.
CPC ............................... G01S 5/02528 (2020.05)
(58) Field of Classification Search
CPC .... G01S 5/02528; G01S 5/0294; G01S 13/89; G01S 13/726; G01S 2205/09
USPC ........................... 701/519; 342/451, 158, 146
See application file for complete search history.

(56) References Cited

U.S. PATENT DOCUMENTS 7,020,431 B2 * 3/2006 Sahara ............... G03G 15/2028
                                        399/397
2005/0004759 A1 * 1/2005 Siegel .................... G01S 13/66
                                        701/519

FOREIGN PATENT DOCUMENTS

| JP | 2000-075023 A | 3/2000 |
|---|---|---|
| JP | 2005-505209 A | 2/2005 |
| JP | 2010-503874 A | 2/2010 |
| JP | 2013-042409 A | 2/2013 |
| JP | 2020-166802 A | 10/2020 |

OTHER PUBLICATIONS

International Search Report for PCT Application No. PCT/JP2020/040623, mailed on Jan. 19, 2021.

(Continued)

*Primary Examiner* — Bo Fan
(74) *Attorney, Agent, or Firm* — Sughrue Mion, PLLC

(57)          ABSTRACT

When determining, from a plurality of sensors (10), a sensor (10) for observing a plurality of moving objects (20), based on positions of the plurality of moving objects (20), an allocation determination apparatus (2000) executes annealing on an allocation determination model of which value is larger as the number of the moving objects (20) that are not observed by any of the plurality of sensors (10) is larger, and of which value is smaller as the number of the moving objects (20) that are not observed by any of the plurality of sensors (10) is smaller, and thereby determines allocation of the moving object (20) to each of the sensors (10) in a case in which the value of the allocation determination model decreases.

17 Claims, 7 Drawing Sheets

(56)     References Cited

OTHER PUBLICATIONS

Serik, M.R., Kaddour. M., "Optimizing Deployment Cost in Camera-Based Wireless Sensor Networks", IFIP International Federation for Information Processing 2015, 2015, CHIA 2015, IFIP AICT 456, pp. 454-464.

Extended European Search Report for EP Application No. 20959811.9, dated on Sep. 28, 2023.

Anurag Mittal et al., "A General Method for Sensor Planning in Multi-Sensor Systems: Extension to Random Occlusion", International Journal of Computervision, vol. 76, No. 1, Jul. 21, 2007, pp. 31-pp. 52.

Hosseini Andargoli Seyed Mehdi et al., "LPI radar network optimization based on geometrical measurement fusion", Optimization and Engineering, vol. 20, No. 1, Sep. 15, 2018, pp. 119-pp. 150.

JP Office Action for JP Application No. 2022-558708, mailed on Mar. 19, 2024 with English Translation.

* cited by examiner

POSTURE OF SENSOR 10-1

POSTURE VECTOR $(s_{11}, s_{12}, s_{13}, s_{14}, \ldots . s_{1num})$
$= (0, 0, 1, 0, \ldots . 0)$

ALLOCATION DETERMINATION APPARATUS, ALLOCATION DETERMINATION METHOD, AND COMPUTER-READABLE MEDIUM

This application is a National Stage Entry of PCT/JP2020/040623 filed on Oct. 29, 2020, the contents of all of which are incorporated herein by reference, in their entirety.

TECHNICAL FIELD

The present disclosure relates to observation of a moving object by using a sensor.

BACKGROUND ART

A technique for observing moving objects by using sensors has been developed. For example, Patent Literature 1 discloses a system for observing moving objects by using a plurality of sensors. In this system, a cost is defined based on a probability that a moving object exists in sensing ranges of the sensors, capacities of the sensors, and the like, and allocation of each of the sensors to each moving object is determined in such a way that the cost is minimized.

CITATION LIST

Patent Literature

[Patent Literature 1]U.S. Patent Application Publication No. 2005/0004759

SUMMARY OF INVENTION

Technical Problem

An inventor of the present invention has studied using annealing in determining allocation of a moving object to a sensor in an environment in which a plurality of sensors observe a plurality of moving objects. One of objectives of the present invention is to provide a new technique of utilizing annealing in determining allocation of a moving object to a sensor in an environment in which a plurality of sensors observe a plurality of moving objects.

Solution to Problem

An allocation determination apparatus according to the present disclosure includes an execution control means for determining, when a sensor for observing a plurality of moving objects is determined from a plurality of sensors, based on positions of the plurality of moving objects, allocation of the moving object to each of the sensors in a case in which a value of a model decreases, by executing annealing on the model in which the value is larger as the number of the moving objects not observed by any of the plurality of sensors is larger, and the value is smaller as the number of the moving objects not observed by any of the plurality of sensors is smaller.

An allocation determination method according to the present disclosure includes, by a computer, when determining, from a plurality of sensors, a sensor for observing a plurality of moving objects, based on positions of the plurality of moving objects, determining allocation of the moving object to each of the sensors in a case in which a value of a model decreases, by executing annealing on the model in which the value is larger as the number of the moving objects not observed by any of the plurality of sensors is larger, and the value is smaller as the number of the moving objects not observed by any of the plurality of sensors is smaller.

A computer-readable medium according to the present disclosure stores a program causing a computer to execute a control method according to the present disclosure.

Advantageous Effects of Invention

According to the present disclosure, there is provided a new technique of utilizing annealing in determining allocation of a moving object to a sensor in an environment in which a plurality of sensors observe a plurality of moving objects.

EXAMPLE EMBODIMENT

Figure 1:
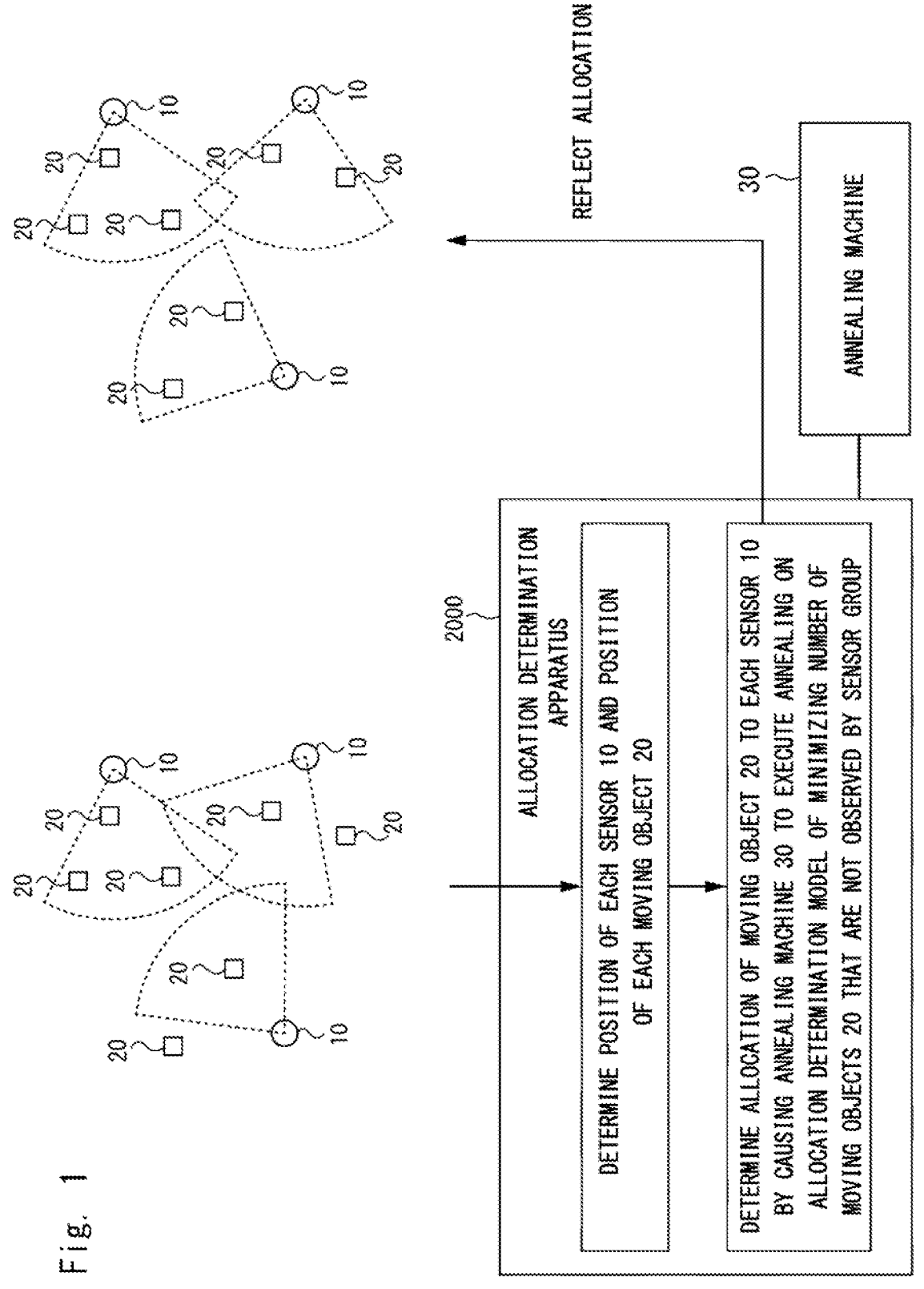
FIG. 1 is a diagram illustrating an overview of an operation of an allocation determination apparatus according to a first example embodiment.

Hereinafter, an example embodiment of the present disclosure will be described in detail with reference to the drawings. In the drawings, the same or corresponding elements are denoted by the same reference numerals, and redundant descriptions are omitted as necessary for clarity of description. Further, unless otherwise specified, values that are defined in advance such as a predetermined value and a threshold value are stored in advance in a storage apparatus accessible from an apparatus that uses the value.

FIG. 1 is a diagram illustrating an overview of an operation of an allocation determination apparatus 2000 according to a first example embodiment. Herein, FIG. 1 is a diagram for facilitating understanding of an overview of the allocation determination apparatus 2000, and the operation of the allocation determination apparatus 2000 is not limited to that illustrated in FIG. 1.

The allocation determination apparatus 2000 is used in an environment in which a plurality of moving objects 20 are observed using a plurality of sensors 10. The sensor 10 performs observation of each of the moving object 20 included in a sensing range thereof. However, in a case in which an observation target can be designated with respect to the sensor 10, the sensor 10 may observe only the designated moving object 20. Hereinafter, a set of the plurality of sensors 10 is also referred to as a "sensor group".

The sensor 10 is any sensor capable of observing a distant object. For example, the sensor 10 is a radar for observing a flying object such as a drone or a missile, a camera for observing a person, a car, or the like, or a wireless base station for capturing a wireless communication terminal.

The moving object 20 is any object whose position can be moved. For example, the moving object 20 is a flying object such as a drone described above, a person or other animal, a car or other vehicle, a wireless communication terminal, or the like.

Herein, in order to reduce the number of moving objects 20 that are not observed by the sensor group as much as possible, it is preferable to appropriately allocate the moving object 20 to each of the sensors 10. "Reducing the number of moving objects 20 that are not observed by the sensor group as much as possible" can be rephrased as "Increasing the number of moving objects 20 observed by the sensor group as much as possible". Note that, "the moving object 20 is not observed by the sensor group" means that the moving object 20 is not observed by any of the sensors 10. Meanwhile, "the moving object 20 is observed by the sensor group" means that the moving object 20 is observed by any one or more of the sensors 10.

"Allocating the moving object 20 to the sensor 10" means that the sensor 10 is caused to observe the moving object 20, or that information on the moving object 20 observed by the sensor 10 is used for subsequent processing (analysis using an observation result, or the like). In the latter case, for example, the sensor 10 is assumed to be a camera. In this case, for example, only the moving objects 20 allocated to the sensor 10 among the moving objects 20 captured by the sensor 10 are treated as targets of image analysis using captured images acquired from the sensors 10. By determining allocation of the moving object 20 to the sensor 10 in the above-described way, it is possible to achieve distribution of a processing load, and the like.

The allocation determination apparatus 2000 determines allocation of the moving object 20 to each of the sensors 10 in such a way that the number of moving objects 20 that are not observed by the sensor group becomes as small as possible. Such allocation can be achieved by searching for a solution to an optimization problem that "determining allocation of the moving objects 20 to each sensor 10 in such a way as to minimize the number of moving objects 20 that are not observed by the sensor group".

The allocation determination apparatus 2000 utilizes an annealing machine 30 in searching for the solution to the above-described optimization problem (a combination of the allocations of the moving object 20 to the sensor 10). In order to achieve this, the allocation determination apparatus 2000 generates a model (hereinafter, referred to as an allocation determination model) representing the above-described optimization problem. The allocation determination model includes an objective function of the above-described optimization problem. For example, it is assumed that the optimization problem whose solution is to be searched is represented as an optimization problem that minimizes an objective function. In this case, the objective function is a function having a property that the smaller a value of the objective function is, the smaller the number of moving objects 20 that are not observed by the sensor group is (the larger the number of moving objects 20 observed by the sensor group is).

A variable reflecting the allocation of the moving object 20 to each of the sensors 10 is used in the allocation determination model. The variable may be a variable that directly represents the allocation of the moving object 20 to the sensor 10, or may be a variable that represents other information that depends on the allocation of the moving object 20 to the sensor 10. The variable reflecting the allocation of the moving object 20 to each sensor 10 will be described later.

Herein, whether a specific sensor 10 can observe a specific moving object 20 depends on a position of the sensor 10 and a position of the moving object 20. Therefore, these values need to be reflected in the allocation decision model.

Therefore, the allocation determination apparatus 2000 determines a position of each of the sensors 10 and a position of each of the moving objects 20, and generates an allocation determination model in which these values are reflected. Further, the allocation determination apparatus 2000 causes the annealing machine 30 to execute annealing on the generated allocation determination model. In this way, the annealing machine 30 searches for a solution to an optimization problem represented by the allocation determination model. As described above, the variable of the objective function includes a variable reflecting the allocation of the moving object 20 to each of the sensors 10. Therefore, as a result of the search for a solution to the optimization problem, a value of the variable reflecting the moving object 20 to be allocated to the sensor 10 is acquired for each of the sensors 10. The allocation determination apparatus 2000 determines the moving object 20 to be allocated to each of the sensors 10 by using a value of the variable acquired in this way. A specific method of reflecting the position of each of the sensors 10 and the position of each of the moving objects 20 in the allocation determination model will be described later.

Here, an optimum solution is not always acquired in the search for a solution of the optimization problem by annealing. Therefore, the moving object 20 to be allocated to each of the sensors 10 determined by the allocation determination apparatus 2000 may be the moving object 20 that is determined by using a result of searching for a solution to the optimization problem by annealing on the allocation determination model, and may not necessarily be an optimum solution of the optimization problem (that is, allocation of the moving object 20 to each of the sensor 10 with which the number of moving objects 20 that are not observed by the sensor group is minimized).

Example of Advantageous Effects

According to the allocation determination apparatus 2000 of the present example embodiment, a solution of the optimization problem is searched by performing annealing on the allocation determination model representing the optimization problem of "determining allocation of the moving object 20 to each of the sensors 10 in such a way as to minimize the number of sensors 10 that cannot be observed by the sensor group". As a result, the moving object 20 to be allocated to each of the sensors 10 observing the moving object 20 is determined. Therefore, according to the present disclosure, a technique for appropriately determining, by using annealing, allocation of the moving object 20 to each of the sensors 10 observing the moving object 20 is provided.

Herein, when the number of the sensors 10 and the number of the moving objects 20 are large, a time required for a process of determining the allocation of the moving object 20 to the sensor 10 becomes long. Therefore, it is difficult to determine the allocation of the moving object 20 to the sensor 10 in real time. In addition, in a method of reducing a processing time by using an algorithm such as a greedy method, accuracy of a result becomes low, and there is a possibility that the allocation of the moving object 20 to the sensor 10 cannot be appropriately determined. In this regard, by using a method of searching for a solution to an optimization problem by using annealing, an appropriate allocation of the moving object 20 to the sensor 10 can be determined in a short time. Therefore, for example, the allocation of the moving object 20 to each of the sensors 10 can be appropriately controlled in real time.

Hereinafter, the allocation determination apparatus 2000 according to the present example embodiment will be described in more detail.

Example of Functional Configuration

Figure 2:
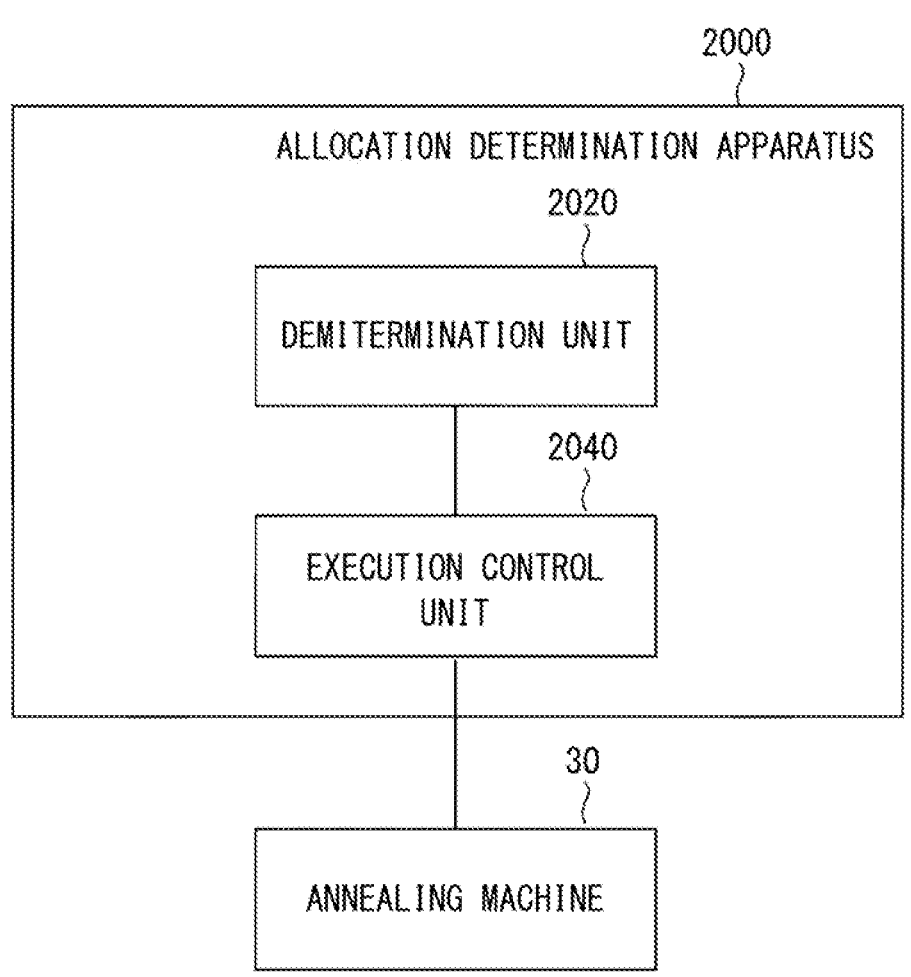
FIG. 2 is a block diagram illustrating a functional configuration of the allocation determination apparatus according to the first example embodiment.

FIG. 2 is a block diagram illustrating a functional configuration of the allocation determination apparatus 2000 according to the first example embodiment. The allocation determination apparatus 2000 includes a determination unit 2020 and an execution control unit 2040. The determination unit 2020 determines a position of each of the sensors 10 and a position of each of the moving objects 20. The execution control unit 2040 causes the annealing machine 30 to execute annealing on an allocation determination model in which the position of each of the sensors 10 and the position of each of the moving objects 20 are reflected. Thereby, the execution control unit 2040 determines allocation of the moving object 20 to each of the sensors 10.

Example of Hardware Configuration

Each functional component of the allocation determination apparatus 2000 may be achieved with hardware (for example, a hardwired electronic circuit, or the like) that achieves each functional component, or may be achieved by a combination of hardware and software (for example, a combination of an electronic circuit and a program that controls the electronic circuit, or the like). Hereinafter, a case in which each functional component of the allocation determination apparatus 2000 is achieved by a combination of hardware and software will be further described.

Figure 3:
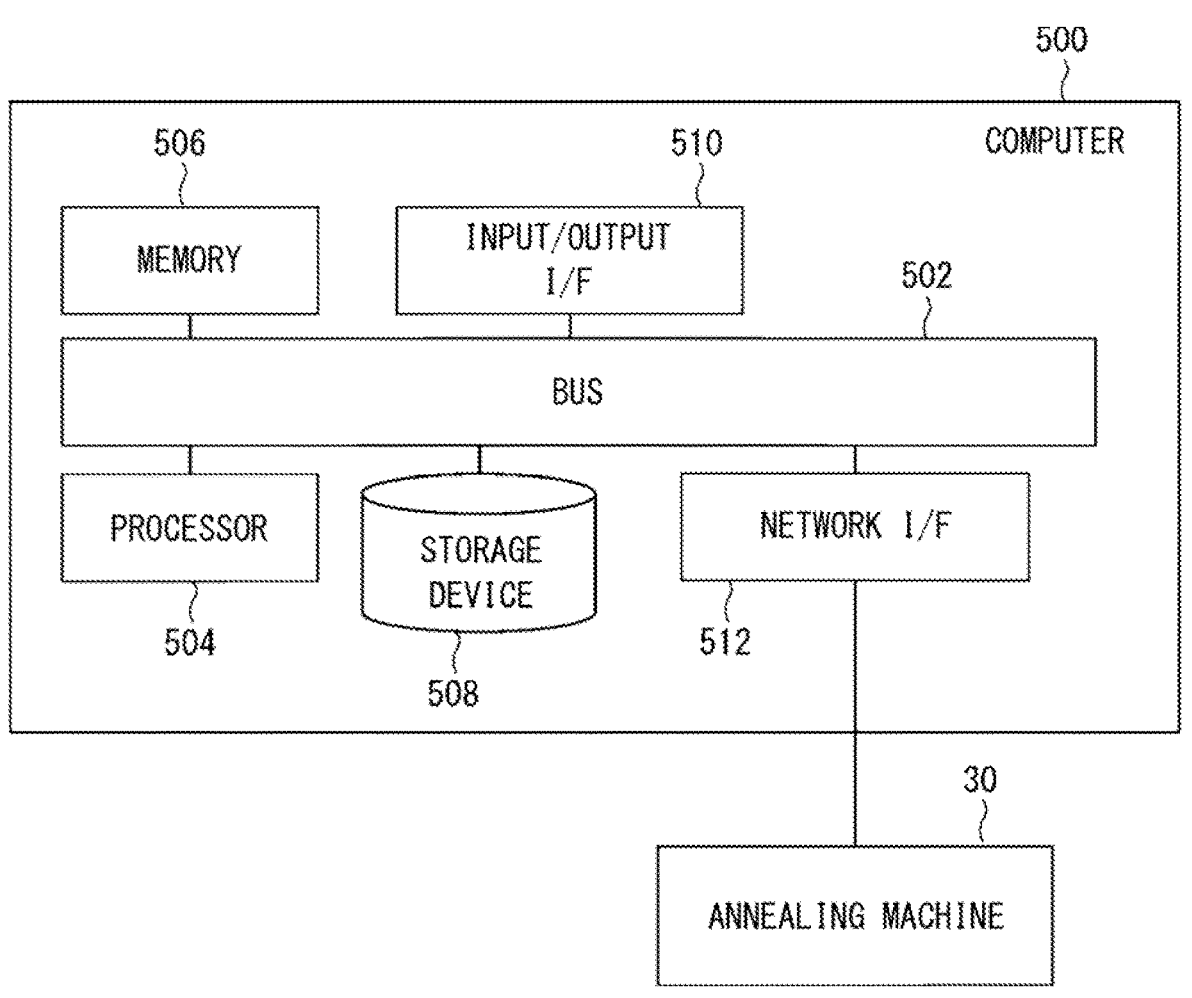
FIG. 3 is a block diagram illustrating a hardware configuration of a computer that achieves the allocation determination apparatus.

FIG. 3 is a block diagram illustrating a hardware configuration of a computer 500 that achieves the allocation determination apparatus 2000. The computer 500 is any computer. For example, the computer 500 is a stationary computer such as a personal computer (PC) or a server machine. Otherwise, for example, the computer 500 is a portable computer such as a smartphone or a tablet terminal. The computer 500 may be a dedicated computer designed for achieving the allocation determination apparatus 2000, or may be a general-purpose computer.

For example, by installing a predetermined application on the computer 500, each function of the allocation determination apparatus 2000 is achieved by the computer 500. The application is configured by a program for achieving functional units of the allocation determination apparatus 2000. A method of acquiring the program may be any method. For example, the program may be acquired from a storage medium (such as a DVD or a USB memory) in which the program is stored. Otherwise, for example, the program may be acquired by downloading the program from a server apparatus that manages a storage apparatus in which the program is stored.

The computer 500 includes a bus 502, a processor 504, a memory 506, a storage apparatus 508, an input/output interface 510, and a network interface 512. The computer 500 may include a quantum chip 520. The bus 502 is a data transmission path through which the processor 504, the memory 506, the storage apparatus 508, the input/output interface 510, and the network interface 512 transmit and receive data to and from each other. However, a method for connecting the processor 504 and the other components to each other is not limited to bus connection.

The quantum chip 520 is a chip that operates using a quantum state in quantum mechanics. The quantum chip 520 operates as described above for an annealing machine. An operation in the annealing machine may be achieved by the quantum chip 520, the processor 504, or the annealing machine 30.

The processor 504 is a various kind of processor, such as a central processing unit (CPU), a graphics processing unit (GPU), or a field-programmable gate array (FPGA). The memory 506 is a primary storage device achieved by using a random access memory RAM) and the like. The storage device 508 is a secondary storage device achieved by using a hard disk, a solid state drive (SSD), a memory card, a read only memory, (ROM), and the like.

The input/output interface 510 is an interface for connecting the computer 500 and an input/output device. For example, an input device such as a keyboard and an output device such as a display device is connected to the input/output interface 510.

The network interface 512 is an interface for connecting the computer 500 to a network. The network may be a local area network (LAN) or a wide area network (WAN). For example, the allocation determination apparatus 2000 is connected to the sensors 10 and the annealing machine 30 via the network interface 512.

The storage apparatus 508 stores a program (a program for achieving the above-described application) for achieving each functional component of the allocation determination apparatus 2000. The processor 504 reads the program into the memory 506 and executes the program, and thereby achieves each functional component of the allocation determination apparatus 2000.

The allocation determination apparatus 2000 may be achieved by one computer 500 or may be achieved by a plurality of computers 500. In the latter case, a configuration of each computer 500 need not be the same, but may be different.

<Annealing Machine 30>

Annealing machine 30 is any computer capable of searching for a solution to an optimization problem by performing annealing on a model representing the optimization problem. The annealing performed by the annealing machine 30 is, for example, quantum annealing or simulated annealing.

The annealing machine 30 may be achieved by a computer different from the computer 500 that achieves the allocation determination apparatus 2000, or may be achieved by the computer 500 that implements the allocation determination apparatus 2000. In the latter case, it can be said that the allocation determination apparatus 2000 has a function of executing annealing.

<Sensor 10>

As described above, the sensor 10 is any sensor capable of observing the moving object 20. In a case in which a posture of the sensor 10 is controlled as described later, the sensor 10 is configured in such a way that the posture thereof can be controlled. For example, the sensor 10 is configured to be capable of changing its orientation by rotating about a specific axis. The number of rotation axes may be one or more.

A position of the sensor 10 may or may not be fixed. In the latter case, for example, the sensor 10 is attached to a moving object (such as a car or a drone) other than the moving object 20, and its position changes as that moving object moves.

<Processing Flow>

Figure 4:
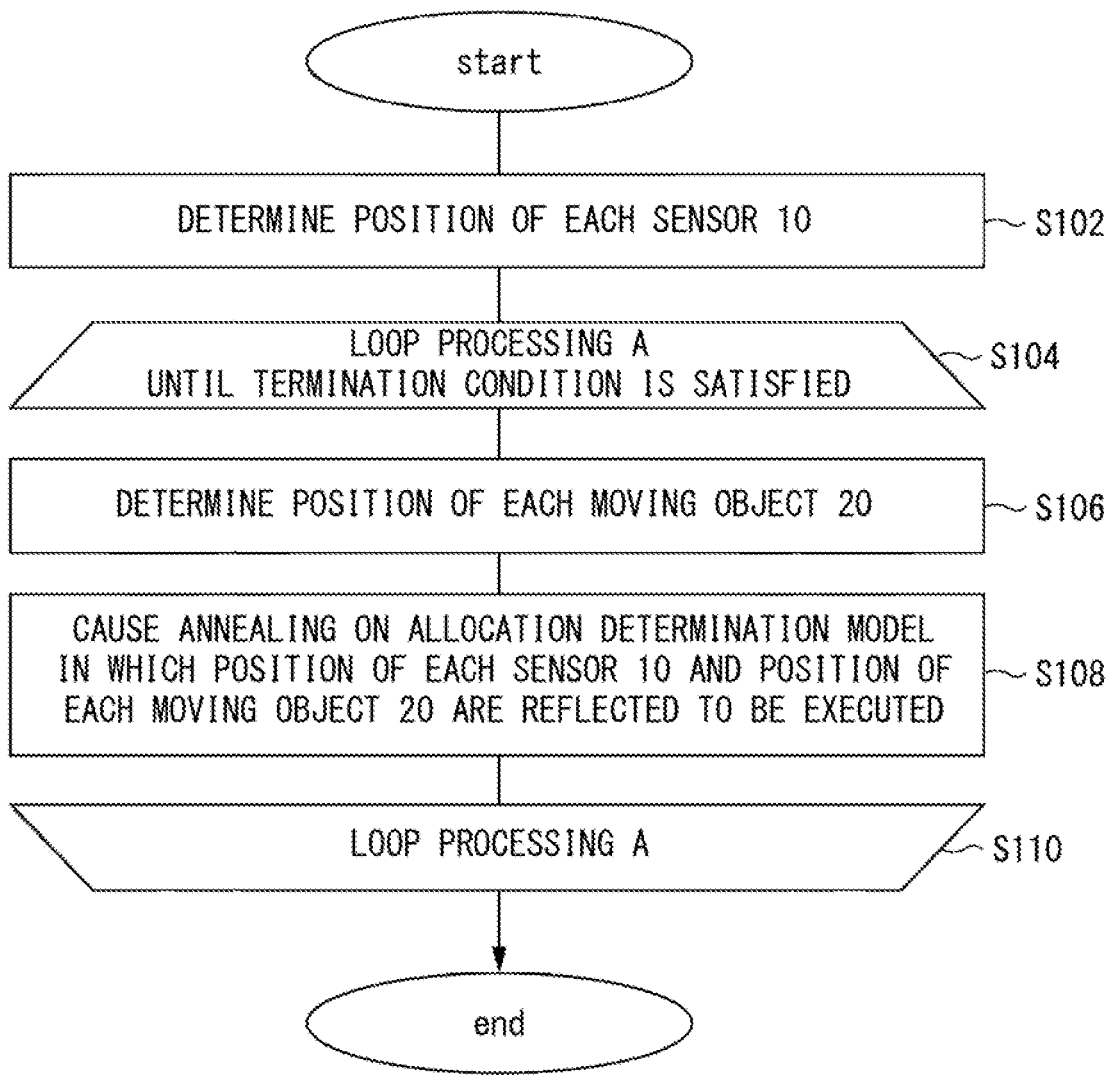
FIG. 4 is a flowchart illustrating a flow of processing executed by the allocation determination apparatus according to the first example embodiment.

FIG. 4 is a flowchart illustrating a flow of processing executed by the allocation determination apparatus 2000 according to the first example embodiment. Herein, it is assumed that positions of the sensors 10 are fixed.

The determination unit 2020 determines a position of each of the sensors 10 (S102). S104 to S110 are loop processing A, which is repeatedly executed until a predetermined termination condition is satisfied. In step S104, the allocation determination apparatus 2000 determines whether or not the termination condition is satisfied. when the termination condition is satisfied, the processing in FIG. 4 is terminated. Meanwhile, when the termination condition is not satisfied, the processing in FIG. 4 proceeds to S106.

The determination unit 2020 determines a position of each of the moving objects 20 (S106). The execution control unit 2040 causes the annealing machine 30 to perform annealing on an allocation determination model in which the position of each of the sensors 10 and the position of each of the moving objects 20 are reflected (S108). Since S110 is the end of the loop processing A, the processing in FIG. 4 proceeds to S104.

As illustrated in FIG. 4, the allocation determination apparatus 2000 repeatedly executes a loop processing A of "determining the positions of the moving objects 20 and causing an execution of annealing on the allocation determination model reflecting those positions". In this way, it is possible to appropriately determine allocation of the moving object 20 to each of the sensors 10 while following movement of each of the moving object 20.

Herein, as described above, in the flowchart in FIG. 4, it is assumed that the positions of the sensors 10 are fixed. Therefore, processing of determining the position of the sensor 10 is performed only once before the loop processing A. In a case in which the sensors 10 move, the execution control unit 2040 further determines a position of each of the sensors 10 in addition to the position of each of the moving objects 20 in S106.

Herein, a predetermined interval may be provided in executing the loop processing A. For example, the allocation determination apparatus 2000 executes the loop processing A at a predetermined frequency, such as once per second. In this way, the allocation determination apparatus 2000 controls allocation of the moving object 20 to each of the sensors 10 at a predetermined frequency.

The termination condition of the loop processing A may be any condition. For example, in a case in which observation of the moving objects 20 is performed only during a specific period, the termination condition is that an end time of the period has arrived. Otherwise, for example, in a case in which a space in which the moving objects 20 are to be observed (hereinafter, referred to as an observation space) is limited, the termination condition may be that all the moving objects 20 have moved out of the observation space.

There are various methods for determining that all the moving objects 20 have moved out of the observation space. For example, a sensor capable of detecting the moving object 20 is provided in such a way as to cover the entire observation space. The sensor may or may not be the sensor 10. In this case, when the moving object 20 is no longer detected by that sensor, it can be realized that all the moving objects 20 have moved out of the observation space.

For example, it is assumed that the sensor 10 is a camera, and persons are tracked while a face of each of the persons in an observation space is captured by the sensor 10. In this case, it is conceivable that another camera is provided in such a way as to capture an overhead view of a wider range than the sensor 10, and thereby the persons present in the observation space are detected. Note that, the observation space may be divided into a plurality of sections, and the moving object 20 may be detected by using a separate sensor for each section. Further, a sensor may be provided in such a way as to monitor a boundary between the observation space and an outside thereof, and whether the moving object 20 is present in the observation space may be determined by monitoring entry and exit of the moving object 20 at the boundary.

Detection of the moving object 20 present in the observation space may be used as a trigger for starting the series of processing in FIG. 4. Specifically, while the moving object 20 is not present in the observation space, the allocation determination apparatus 2000 does not perform the series of processing in FIG. 4, and starts the series of processing in FIG. 4 when it is detected that the moving object 20 has entered the observation space. However, the trigger for starting the series of processing in FIG. 4 is not limited to the entry of the moving object 20 into the observation space. For example, in a case in which observation of the moving object 20 is performed only during a specific period, the series of processing may be started with a trigger that a start time of the period has arrived.

<Determination of Position of Sensor 10: S102>

The determination unit 2020 determines a position of each of the sensors 10 (S102). For this purpose, for example, the determination unit 2020 acquires sensor information indicating information related to each of the sensors 10. The sensor information includes at least information indicating the position of each of the sensors 10.

A method of indicating a position of the sensor 10 may be any method. For example, a position of the sensor 10 is represented by global positioning system (GPS) coordinates. In this case, for example, a position of each of the sensors 10 can be determined by providing a GPS sensor for each of the sensors 10. When the sensor 10 is attached to another object, GPS coordinates acquired from the GPS sensor provided in the another object may be treated as a position of the sensor 10. A position of the sensor 10 may be represented by coordinates on a two-dimensional plane or may be represented by coordinates on a three-dimensional space.

Otherwise, for example, a position of the sensor 10 may be represented by a latitude, a longitude, and an altitude. In this case, a position of each of the sensors 10 can be determined by measuring using a measuring instrument, or the like.

Otherwise, for example, a position of the sensor 10 may be represented by coordinates in an arbitrarily defined coordinate system. For example, as described above, it is assumed that a sensor capable of detecting the moving objects 20 present in the observation space is provided. In this case, for example, by defining any coordinate system in the observation space and detecting the sensors 10 and the moving objects 20 by using the sensor, position of each of the sensors 10 and the moving objects 20 in the coordinate system can be determined. In this case, the determination of positions of the sensors 10 and the moving objects 20 may be performed by the allocation determination apparatus 2000 or may be performed by an apparatus other than the allocation determination apparatus 2000.

There are various ways in which the determination unit 2020 acquires sensor information. For example, the determination unit 2020 acquires sensor information from a storage device in which the sensor information is stored. The storage device may be provided inside the allocation determination apparatus 2000 (for example, the storage device 508) or may be provided outside the allocation determination apparatus 2000. Otherwise, for example, the determination unit 2020 may acquire the sensor information by receiving the sensor information transmitted from another apparatus.

Herein, in a case in which the sensor 10s move, the determination unit 2020 repeatedly determines positions of the sensors 10. For example, when the sensor 10 is attached to a moving object, the determination unit 2020 repeatedly acquires sensor information from the moving object or the sensor 10, and thereby repeatedly determines a position of the sensor 10. Otherwise, for example, in a case in which a sensor that detects the moving objects 20 in the observation space is used, the sensor may also detect the sensors 10, and a position of the sensors 10 may be repeatedly determined by using a result of the detection.

<Determination of Position of Moving Object 20: S106>

The determination unit 2020 determines a position of each of the moving objects 20 (S106). The position of the moving object 20 reflected in the allocation determination model is, for example, the most recently observed position of the moving object 20. There are various methods for determining a position of the moving object 20. For example, a position of the moving object 20 is determined by the sensor 10 that has observed the moving object 20. For example, when the sensor 10 is a sensor capable of measuring a distance, a position of the moving object 20 can be determined based on a position and orientation of the sensor 10 and a distance from the sensor 10 to the moving object 20. Otherwise, for example, by observing one of the moving objects 20 by a plurality of the sensors 10, a position of the moving object 20 can be determined by using so-called triangulation. Otherwise, for example, as described above, in the observation space the moving object 20 detects.

The sensor used for determining a position of the moving object 20 may be other than the sensor 10. For example, as described above, a sensor capable of detecting the moving object 20 present in the observation space may be provided, and a position of the moving object 20 may be determined by using a result of detection by the sensor.

Processing of computing a position of the moving object 20 from a result of detection by the sensor may be performed by the allocation determination apparatus 2000 or may be performed by an apparatus (for example, the sensor) other than the allocation determination apparatus 2000. In the latter case, the allocation determination apparatus 2000 determines a position of the moving object 20 by acquiring information indicating the position of the moving object 20.

<<Determination of Future Position>>

The position of the moving object 20 may change between when the moving object 20 is observed and when the allocation of the moving object 20 to the sensor 10 is changed based on the observation. Therefore, the allocation determination apparatus 2000 may determine a predicted position of the moving object 20 at a timing at which allocation of the moving object 20 to the sensor 10 determined by the allocation determination apparatus 2000 is reflected, and handle the predicted position as the position of the moving object 20 to be reflected in the allocation determination model.

For example, the determination unit 2020 determines a velocity of the moving object 20, based on a plurality of times of observation, and estimates a future position of the moving object 20 based on the velocity and the observed position of the moving object 20. For example, it is assumed that a position and a speed of the moving object 20 at a time Ta are Pa and Va, respectively. Also, it is assumed that allocation of the moving object 20 to the sensor 10 at a time point Tb is determined using the allocation determination apparatus 2000. In this case, the determination unit 2020 determines a predicted position Pb=Pa+Va*(Tb−Ta) of the moving object 20 at the time point Tb as a position of the moving object 20 to be reflected in the allocation determination model.

Further, the determination unit 2020 may further determine an acceleration of the moving object 20, based on a plurality of times of observation, and may estimate a future position of the moving object 20 taking the determined acceleration into consideration.

Note that, an existing technique can be used as a technique of measuring a moving object a plurality of times with a sensor and determining a velocity and an acceleration of the object, based on a temporal change in a position of the moving object.

<<Detection of New Moving Object 20>>

When the moving object 20 is detected using only the sensor 10, when a new moving object 20 appears, in some cases, none of the sensors 10 is in a state of being capable of detecting the new moving object 20, and the appearance of that moving object 20 cannot be detected. Thus, for example, appearance of a new moving object 20 may be detected using a sensor other than the sensor 10. For example, as described above, a sensor different from the sensor 10 is provided in such a way that the entire observation space can be observed. Then, the moving object 20 that newly appears in the observation space is detected by using the sensor.

However, appearance of the new moving object 20 may also be detected using the sensor 10. For example, at least one of the plurality of sensors 10 is installed at a position where a boundary between the observation space and the outside thereof can be observed. Then, these sensors 10 are configured not to become a state of being incapable of observing the boundary. By doing so, it is possible to detect, by using the sensor 10, that the moving object 20 enters the observation space (in other words, the new moving object 20 appears).

<Allocation Determination Model>

As described above, for example, the allocation determination model is a model for searching for a solution to an optimization problem of "determining allocation of the moving object 20 to each of the sensors 10 in such a way as to minimize the number of the moving objects 20 that are not observed by the sensor group". The allocation determination model includes an objective function for solving the problem. However, as described above, this optimization problem can also be expressed as "determining allocation of the moving object 20 to each of the sensors 10 in such a way as to maximize the number of the moving objects 20 that are observed by the sensor group".

When an optimization problem of searching for a solution is expressed as an optimization problem of minimizing an objective function, the objective function is a function having a property that "the smaller a value of the objective function is, the smaller the number of the moving objects 20 that are not observed by the sensor group is (the larger the number of the moving objects 20 that are observed by the sensor group is)". Meanwhile, when an optimization problem of searching for a solution is expressed as an optimization problem of maximizing an objective function, the objective function is a function having a property that "the larger a value of the objective function is, the smaller the number of the moving objects 20 that are not observed by the sensor group is (the larger the number of the moving objects 20 observed by the sensor group is)".

When the annealing machine 30 is a quantum annealing machine, the allocation determination model is expressed, for example, by an expression whose format is equivalent to an Ising model (for example, a quadratic unconstrained Binary optimization (QUBO) format). However, the annealing machine 30 is not limited to a quantum annealing machine, and the allocation determination model is also not limited to the Ising model. In the following, a specific example of a case in which the allocation determination model is expressed by an expression in the QUBO format will be described. Further, the optimization problem of searching for a solution is represented as a problem of minimizing an objective function.

The objective function of the allocation determination model is expressed by, for example, the following Expression (1).

[Expression 1]

$$\sum_{\alpha=1}^{Tnum} \left( 1 + \sum_{n=1}^{Snum-1} z_{n,\alpha} - \sum_{n=1}^{Snum} x_{n,\alpha} \right)^2 \qquad (1)$$

$\alpha$ represents an identifier of the moving object 20. Tnum represents a total number of the moving objects 20. n represents an identifier of the sensor 10. Snum represents a total number of the sensors 10. Variable z is an auxiliary variable used for representing a value from 0 to sum−1, and the value thereof is 0 or 1.

Variable x represents allocation of the moving object 20 to the sensor 10. Hereinafter, the variable x is referred to as an allocation variable. The allocation variable takes a value of 0 or 1. Specifically, when the moving object 20 having the identifier a (hereinafter, a moving object 20-$u$) is allocated to the sensor 10 having the identifier n (hereinafter, the sensor 10-$n$), x_[n,$\alpha$]=1. Meanwhile, when the moving object 20-$\alpha$ is not allocated to the sensor 10-$n$, x_[n,$\alpha$]=0. In other words, when the sensor 10-$n$ observes the moving object 20-$a$, "x_[n,$\alpha$]=1". Meanwhile, when the sensor 10-$n$ does not observe the moving object 20-$\alpha$, "x_[n,$\alpha$]=0".

In Expression (1), a value of 1−$\Sigma z$−$\Sigma x$ can be set to 0 by setting x and z in such a way that $\Sigma x$ is greater than $\Sigma z$ by 1. In this way, Expression (1) can be minimized. However, when Ex is 0 (Specifically, when neither of the sensors 10 is allocated to the moving object 20), 1−$\Sigma z$−$\Sigma x$ becomes equal to or greater than 1. Therefore, by searching a solution that minimizes Expression (1), it is possible to acquire a combination of values of the variables in which, for all the moving objects 20-$\alpha$, $\Sigma x$ is not zero as much as possible. Specifically, it is possible to acquire a combination of values of the variables in which one or more sensors 10 are allocated as much as possible to all the moving objects 20-$\alpha$. Therefore, a combination of values of the variables is acquired in such a way as to minimize the number of the moving objects 20 that are not observed by the sensor group.

In other words, as the number of the moving objects 20 that are not observed by any of the sensors 10 increases, a value of the objective function represented by Expression (1) increases. Meanwhile, as the number of the moving objects 20 that are not observed by any of the sensors 10 decreases, the value of the objective function represented by Expression (1) decreases. Therefore, the annealing machine 30 determines allocation of a sensor by searching for a case in which the value of the objective function decreases. Further, since the objective function represented by Expression (1) includes the allocation variable x, it can also be said that the objective function is a function indicating whether a plurality of the sensors observe each moving object at a position acquired in processing such as S106 (or prediction as described above in the section of "Determination of Future Position"). Hereinafter, a constraint and the objective function are collectively referred to as a "model". However, the model may represent at least the objective function, and may not necessarily include the constraint.

The allocation determination model may include constraints in addition to the objective function. For example, the allocation determination model can be expressed as the following expression by combining the above-described objective function and the constraints. An optimization problem in this example is to minimize the objective function while satisfying the constraints.

[Expression 2]

$$H = \sum_{\alpha=1}^{Tnum} \left( 1 + \sum_{n=1}^{Snum-1} z_{n,\alpha} - \sum_{n=1}^{Snum} x_{n,\alpha} \right)^2 + \qquad (2)$$
$$C_1 \sum_{n=1}^{Snum} \left( 1 - \sum_{d=1}^{Dnum} s_{n,d} \right) + C_2 \sum_{n=1}^{Snum} \left( \sum_{d=1}^{Tnum} \left( s_{n,d} \sum_{\alpha \notin T_{n,d}} x_{n,a} \right) \right)$$

C1 and C2 are positive real numbers that represent strength of each constraint. d represents an identifier of a posture (orientation of the sensor 10). Dnum represents a total number of possible postures that the sensor 10 can take. s_[n,d] is a variable (hereinafter, referred to as a posture variable) representing a posture of the sensor 10-$n$. A set T_[n,d] is a set of identifiers of the moving objects 20 that are observable by the sensor 10-$n$ facing in a direction d.

In the above Expression (2), a first term on a right side represents the objective function of the above Expression (1). Meanwhile, a second term and a third term on the right side each represent a constraint (details will be described later). In a model obtained by adding the objective function to be minimized and the constraints in this way, when the term of the constraint becomes larger in exchange for reducing the term of the objective function, a value of the entire model (that is, a value of H) cannot be minimized. Therefore, by generating an allocation determination model in which an objective function to be minimized and constraints are added, and searching for a combination of values of variables that minimizes a value of the entire model, it is possible to search for a combination of values of the variables that minimizes the objective function while satisfying the constraints.

The above-described allocation determination model includes the posture variables and the allocation variables. Therefore, by searching for a solution to an optimization problem represented by such an allocation determination model, a combination of values of the posture variables and a combination of values of the allocation variables are determined in such a way as to reduce the number of the moving objects 20 that are not observed by the sensor group as much as possible. According to the combination of values of the posture variables determined in this way, it is possible to determine a posture to be set for each of the sensors 10. Further, according to the combination of values of the allocation variables determined in this way, it is possible to determine the moving object 20 to be allocated to each of the sensor 10.

Expression (2) will be explained in more detail below. First, the posture variable s will be explained. In a model in a format equivalent to the Ising model, the number of values that a variable can take needs to be two (in other words, the variable needs to be a binary variable). Meanwhile, the number of postures that the sensor 10 can take is not limited to two. Therefore, in the above-described allocation determination model, the posture of the sensor 10 that can take three or more values is represented by a binary variable by introducing the posture variable s.

Figure 5:
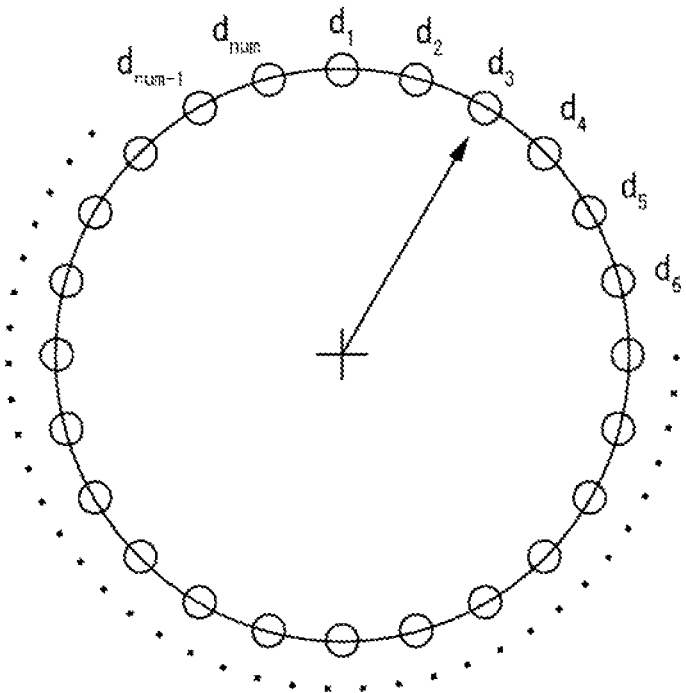
FIG. 5 is a diagram for explaining a posture variable.

FIG. 5 is a diagram for explaining the posture variable. In this example, a posture of the sensor 10 is represented by a direction on a two-dimensional plane. There are num ways of direction, from d1 to dnum, in which the sensor 10 can face.

A posture variable s_[i,j] indicates 1 when a sensor 10-*i* faces in a direction dj, and indicates 0 when the sensor 10-*i* does not face in the direction dj. In this way, the posture variable s representing a posture of the sensor 10-*i* can be realized by a binary variable.

Note that, since only one posture can be taken by the sensor 10-*i* at a specific time point, a posture vector (s_[i,1], s_[i,2], . . . , s_[i,num]) in which posture variables for the sensor 10-*i* are listed is a one-hot vector in which only one element indicates 1 and the other elements indicate 0. For example, in FIG. 5, a sensor 10-1 faces in the direction d1. Therefore, a posture vector for the sensor 10-1 is (s_[1,1]=1, s_[1,2]=0, . . . , s_[1,num]=0).

Herein, a range in which a posture of the sensor 10 can be changed is not limited to one plane. For example, the posture of the sensor 10 may be changeable on each of an x-plane, a y-plane, and a z-plane orthogonal to each other. In other words, the posture of the sensor 10 may be expressed as a combination of a direction on the x-plane, a direction on the y-plane, and a direction on the z-plane.

In this case, for example, s_[i,u,v,w] is introduced as the posture variable. u is an identifier for a direction on the x-plane, v is an identifier for a direction on the y-plane, and w is an identifier for a direction on the z-plane. Further, it is assumed that an orientation of the sensor 10 on the x-plane is expressed by one of directions d_[1,1] to d_[1,num] on the x-plane, an orientation of the sensor 10 on the y-plane is expressed by one of directions d_[2,1] to d_[2,num] on the-y plane, and an orientation of the sensor 10 on the-z plane is expressed by one of directions d_[3,1] to d_[3,num] on the z-plane. Further, it is assumed that a direction in which the sensor 10-*i* faces is d_[1,3] in an x-direction, d_[2,5] in a y-direction, and d_[3,1] in a z-direction. In this case, the posture variable for the sensor 10-*i* is 1 only for s_[i,3,5,1] and 0 for others.

The two constraints in Expression (2) will be explained. A first constraint, which is the second term on the right side, represents a constraint that each of the sensors 10 can take one posture at a specific timing. In parentheses in the second term, a condition regarding a posture (hereinafter, referred to as a "posture condition") is expressed that a posture of the sensor 10-*n* is any one posture d of the Dnum types of postures. For convenience of explanation, the types of posture are represented as discrete ones, but the posture may vary continuously. For the particular sensor 10-*n*, a value of 1−Σs_[n,d] is 0 only when there is one s_[n,d] having a value of 1, and otherwise the value of 1−Σs_[n,d] is a positive value. Herein, a case in which there is one s_[n,d] having a value of 1 means that the sensor 10-*n* faces in only one direction. Therefore, by searching for a combination of variables that minimizes an allocation determination model including this term, the posture variable is determined in such a way that each of the sensors 10 faces in only one direction.

Therefore, a direction that each sensor can observe is divided into a plurality of sections. The second term on the right side of the model described as Expression (2) indicates that a value of the model is smaller as the number of sections observed by the sensor is closer to 1, and the value of the model is larger as the number of sections observed by the sensor is farther from 1. Therefore, by performing annealing processing on a model including the second term on the right side of Expression (2), it is possible to determine allocation of the sensor in such a way that the number of sections observed by the sensor is close to 1.

A second constraint, which is the third term on the right side, represents a constraint that the sensor 10 is not allocated the moving object 20 that the sensor 10 cannot observe. In the third term, Σx_[n,α] represents an allocation state for a moving object existing outside a sensing range represented by the direction d of the sensor 10-*n*. Further, E_{d=1}( . . . ) represents a condition (hereinafter, representing a "sensing range condition") on an allocation state regarding a moving object existing outside the sensing range represented by the direction d wherein the sensor 10-*n* faces in the direction d. Thus, the third term represents sensing range conditions for all the sensors. In other words, it can also be said that, the third term represents a condition that, when a moving object is present in a sensing range in a direction in which the sensor 10 faces, sensing of the moving object is allocated to the sensor 10.

In the third term on the right side, in the case where the sensor 10-*n* faces in the direction d (when s_[n,d]=1), s_[n,d]*Σx_[n,α] becomes a positive value if one or more of the moving objects 20 that cannot be observed by the sensor 10-*n* facing in the direction d (the moving objects 20 that are not included in T_[n,d]) are allocated to the sensor 10-*n* (specifically, if any one or more x_[n,α] is 1). Meanwhile, in the case where the sensor 10-*n* faces in the direction d, s_[n,d]*Σx_[n,α]=0 is satisfied if the sensor 10-*n* is not allocated to any of the moving objects 20 that cannot be observed by the sensor 10-*n* facing in the direction d (specifically, if all x_[n,α] are 0). Therefore, by searching for a combination of variables that minimizes an allocation determination model including this term, it is possible to avoid allocating, to the sensor 10, the moving object 20 that cannot be observed.

In other words, the third term on the right side of the model illustrated in Expression (2) indicates that the value of the model is larger as the number of allocations of the moving objects in a section that is not observed by the sensor to the sensor is larger. Therefore, by performing annealing processing on a model including the third term on the right side of Expression (2), it is possible to avoid allocation of a sensor to moving objects in a section that is not observed by the sensor.

In order to search for a solution to the allocation determination model represented by Expression (2), it is necessary to generate a set Tn,d included in a third constraint. Therefore, the execution control unit 2040 generates the set T_[n,d], based on a position of each of the sensors 10 and a position of each of the moving objects 20. Hereinafter, a specific example of a method for generating T_[n,d] will be described.

Herein, it is assumed that, for each of the sensors 10, which range can be sensed based on a position and a posture of the sensor 10 is defined in advance. For example, the predefined range that can be sensed can be expressed as "a range in which a distance from the sensor 10 is equal to or greater than β1 [m] and equal to or less than β2 [m]" regarding distance, and "a range between equal to or greater than −γ1 [degrees] and equal to or less than γ2 [degrees] (γ>0) with a front direction of the sensor 10 as a basis direction of 0 degree" regarding direction. This information is included in the sensor information, for example, together with the position of the sensor 10.

The execution control unit 2040 determines, for each posture that the sensor 10 can take, a sensing range of the sensor 10 based on the above-described information and the position of the sensor 10. Then, the execution control unit 2040 generates the set T_[n,d] by determining the moving object 20 included in the determined sensing range.

Figure 6:
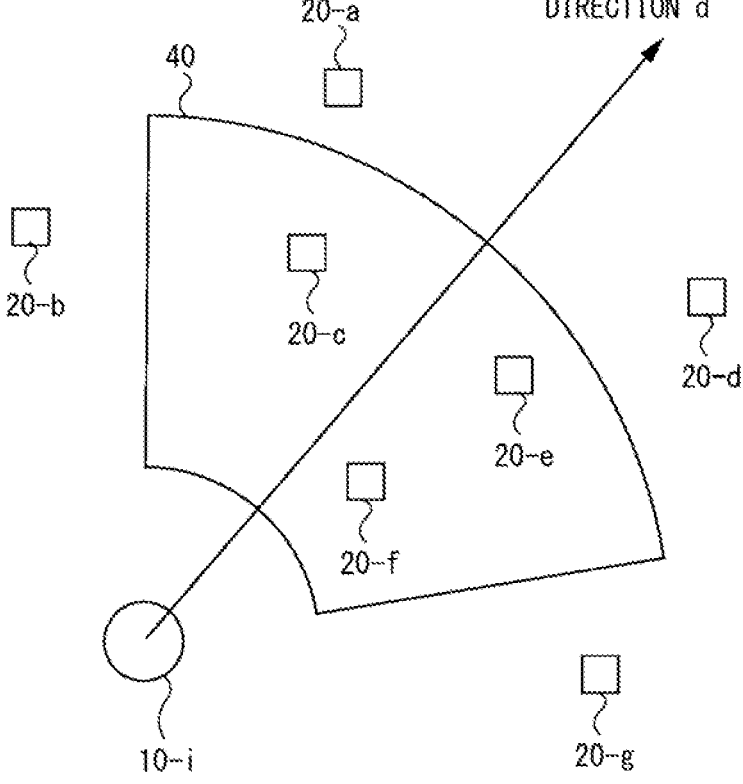
FIG. 6 is a diagram conceptually illustrating a method of generating a set T_[n,d]

FIG. 6 is a diagram conceptually illustrating the method of generating the set T_[n,d]. In this diagram, a case in which the sensor 10-$i$ faces in the direction d is illustrated. A region 40 represents a sensing range of the sensor 10-$i$ facing in the direction d. In this example, the region 40 includes a moving object 20-$c$, a moving object 20-$e$, and a moving object 20-$f$. Therefore, the execution control unit 2040 generates a set T_[i,d]={c,e,f}.

Note that, the objective function may be defined not to use the auxiliary variable z. In this case, the objective function can be defined, for example, as follows.

[Expression 3]

$$\sum_{\alpha=1}^{Tnum}\left[\left(1.5-\sum_{n=1}^{Snum}x_{n,a}\right)^2-0.25\right] \quad (3)$$

In Expression (3), the value in [ ] for the moving object 20-$\alpha$ is 0 when there are one or two sensors 10 for which x_[n,a] is 1, and is a positive value otherwise. Thus, by making as many moving objects 20 as possible being allocated to one or two of the sensors 10, the value of the above-described objective function can be reduced. Accordingly, by searching for a solution to an optimization problem that minimizes the above-described objective function, it is possible to reduce the number of moving objects 20 that are not observed.

<Execution of Annealing: S106>

The execution control unit 2040 causes the annealing machine 30 to perform annealing on the allocation determination model in which the position of each of the sensors 10 and the position of each of the moving objects 20 determined by the determination unit 2020 are reflected (S106). As a specific method for causing the annealing machine 30 to perform annealing on a specific model, various existing methods can be adopted.

For example, the determination unit 2020 generates an allocation determination model represented by Expression (2) and the like, by using the position of the sensor 10 and the position of the moving object 20 determined by the determination unit 2020. Further, the execution control unit 2040 transmits a request indicating the generated allocation determination model to the annealing machine 30. In response, the annealing machine 30 performs annealing using the allocation determination model, and thereby searching for a solution to the optimization problem represented by the allocation determination model. Thereafter, the annealing machine 30 transmits a response including information (result information to be described later) indicating a determined combination of variables to the allocation determination apparatus 2000.

<Acquisition of Result>

The allocation determination apparatus 2000 acquires the information indicating a result of annealing by the annealing machine 30. Hereinafter, this information is referred to as result information. The result information indicates a value of each variable determined by annealing. For example, when the allocation determination model is expressed by Expression (2), values of the allocation variables x, the posture variables s, and the auxiliary variables z are determined by annealing.

However, the auxiliary variable z is not used to control the sensor 10. Therefore, the result information provided from the annealing machine 30 may not include information about the auxiliary variables z.

There are various methods in which the allocation determination apparatus 2000 acquires the result information. For example, the allocation determination apparatus 2000 acquires the result information by receiving the result information transmitted from the annealing machine 30. Otherwise, for example, the annealing machine 30 may store the result information in a storage device accessible from the allocation determination apparatus 2000. In this case, the allocation determination apparatus 2000 acquires the result information by reading the result information from the storage device.

<Control of Sensor 10>

The allocation determination apparatus 2000 controls the sensor 10, based on the values of the variables determined for each of the sensors 10. For example, the allocation determination apparatus 2000 controls the posture of the sensor 10 based on the value of the posture variable. For example, in a case in which the allocation determination model is expressed by Expression (2), the execution control unit 2040 controls the posture of the sensor 10-$n$ to face in the direction d with which s_[n,d]=1 is satisfied.

In another example, the allocation determination apparatus 2000 controls observation of the moving object 20 by the sensor 10, based on the allocation variables. For example, when the sensor 10 can be controlled in such a way as to observe only designated objects, the allocation determination apparatus 2000 controls the sensor 10-$n$ in such a way as to observe each of the moving objects 20-$\alpha$ for which x_[n,α]=1 is satisfied. Note that, an existing technique can be used as a technique for controlling a sensor in such a way as to observe only designated objects.

In another example, it is assumed that only the moving objects 20 allocated to the sensor 10 are targets of analysis using a result of observation by the sensor 10. In this case, the allocation determination apparatus 2000 determines, for each of the sensors 10, the moving objects 20 to be analyzed using a result of observation by the sensor 10, and only the determined moving objects 20 are to be analyzed. For example, a target of analysis using a result of observation by the sensor 10-$n$ is each of the moving objects 20-$\alpha$ for which x_[n,α]=1 is satisfied.

Note that, analysis processing may be performed by the allocation determination apparatus 2000 or may be performed by an apparatus other than the allocation determination apparatus 2000. In the latter case, the allocation determination apparatus 2000 provides information indicating a combination of "the sensor 10 and targets of analysis using a result of observation by the sensor 10" to an analysis apparatus that performs analysis processing.

<Other Constraints>

The allocation determination apparatus 2000 may determine allocation of the moving object 20 to each of the sensors 10 in such a way as to satisfy various conditions by further adding constraints to the allocation determination model. Some of such constraints are exemplified below.

<Constraint on Capacity of Sensor 10>

An upper limit may be defined regarding the number of moving objects 20 to be allocated to each of the sensors 10. Hereinafter, the number of moving objects 20 that can be allocated to the sensor 10 is referred to as capacity of the sensor 10. By defining an upper limit to the number of moving objects 20 to be allocated to the sensor 10, it is possible to avoid concentrating a load on a specific sensor 10 and to avoid an occurrence of mis-observation.

A constraint for setting an upper limit on the capacity of the sensor 10 is expressed by, for example, the following Expression (4).

[Expression 4]

$$C_3 \sum_{n=1}^{Snum} \left[ \sum_{m=1}^{capa} y_{n,m} - \sum_{a=1}^{Tnum} x_{n,a} \right]^2 \tag{4}$$

C3 is a positive real number that represents constraint strength of the above-described constraint. capa represents the number of the moving objects 20 that can be allocated to one sensor 10. $y\_[n,m]$ is an auxiliary variable indicating 0 or 1. In Expression (4), the capacity is common to all the sensors 10. However, the capacity may be different for each of the sensors 10.

In Expression (4), $\Sigma y\_[n,m]$ can take a value being greater or equal to 0 and being smaller or equal to capa. Therefore, when $\Sigma x\_[n,\alpha] <= capa$ (i.e., the number of the moving objects 20 allocated to the sensor 10-$n$ is equal to or less than capa), it is possible to make a value of Expression (4) zero by appropriately setting $y\_[n,m]$ in such a way that $y\_[n, m]-\Sigma x\_[n,\alpha]=0$ is satisfied. Meanwhile, when $\Sigma x\_[n,\alpha] >capa$, $\Sigma y\_[n,m]-\Sigma x\_[n,\alpha]=0$ cannot be satisfied, and thus the value of Expression (4) becomes larger than 0. Therefore, it is possible to prevent the number of the moving objects 20 allocated to the sensor 10 from exceeding the capacity of the sensor 10 by searching for variables that minimize the Expression (4).

<<Limitation based on Magnitude of Posture Change of Sensor 10>>

When a posture of the sensor 10 is greatly changed, time required for changing the posture of the sensor 10 increases, and therefore, time during which the sensor 10 is unable to perform observation or time during which the sensor 10 is unable to perform accurate observation may increase. Further, as a change in the posture of the sensor 10 increases, a load on a mechanical mechanism of the sensor 10 increase, which may shorten a life of the sensor 10.

Thus, for example, a constraint for reducing a change in the posture of the sensor 10 may be added to the allocation determination model. In this way, the posture of the sensor 10 is determined in such a way that the change in the posture of the sensor 10 is reduced as much as possible. Therefore, it is possible to shorten the time during which the sensor 10 is unable to perform observation or the time during which the sensor 10 is unable to perform accurate observation, or to lengthen the life of the sensor 10.

A term representing the constraint for reducing the change in the posture of the sensor 10 is represented by, for example, the following Expression (5).

[Expression 5]

$$C_4 \sum_{n=1}^{Snum} \sum_{d=1}^{Dnum} s_{n,d} * P_{n,d} \tag{5}$$

C4 is a positive real number representing strength of the constraint. $P\_[n,d]$ represents a magnitude of a penalty given when the sensor 10-$n$ faces in the direction d.

Figure 7:
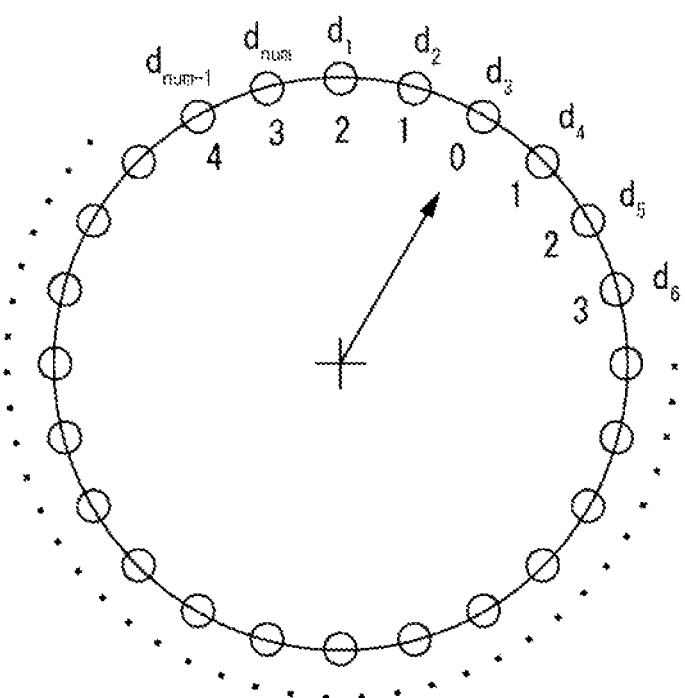
FIG. 7 is a diagram illustrating a penalty determined according to a change in a posture of a sensor.

In the above-described constraint, the penalty $P\_[n,d]$ is determined in such a way that a value increases as the change in the posture of the sensor 10 increases. FIG. 7 is a diagram illustrating a penalty determined according to a change in the posture of the sensor 10. The penalty given for each posture is noted inside a circle.

In an example in FIG. 7, a current orientation of the sensor 10-$n$ is d3. Therefore, a penalty $P\_[n,3]$ for the same orientation d3 is 0. Penalties for d2 and d4, which differ in orientation from d3 by one step, are 1 ($P\_[n,2]=P\_[n,4]=1$).

When this is generalized, in a case in which the current orientation of the sensor 10-$n$ is a direction dj, penalties for $d\_[j+k]$ and $d\_[j-k]$, which differ in orientation from the direction dj by k steps are k ($P\_[n,j\pm k]=k$). Note that, k is a positive integer that satisfies $k<=dnum/2$.

Thus, the farther a section where a moving object observed by a sensor (to which a sensor is allocated) is present is from a section being observed by the sensor, the greater a value of a model including Expression (5) is. Meanwhile, the closer the section where the moving object observed by the sensor (to which the sensor is allocated) is present is to the section being observed by the sensor, the smaller the value of the model including Expression (5) is. Therefore, by performing the annealing processing on the model including Expression (5), an advantageous effect of determining such an allocation that reduces a change in the posture of the sensor is achieved.

<<Limitation for Reducing Switching of Sensor 10>>

When the sensor 10 to which a particular moving object 20 is allocated is switched from the sensor 10 to which the moving object 20 has been allocated to another sensor 10 (in a case of handover to the another sensor 10), various kinds of processing associated with the change may occur. For example, it is assumed that the sensor 10 is a base station of a wireless communication terminal, and the moving object 20 is a wireless communication terminal. When a base station that observes a particular wireless communication terminal is switched, handover processing for switching the base station in charge is performed. When the sensor 10 is switched in this way, it becomes difficult for the sensor 10 to perform observation during switching, and a processing load for switching occurs. Therefore, it is preferable to reduce the number of times of switching the sensors 10 as much as possible. In other words, when a particular sensor 10 observes the moving object 20, it is preferable that the sensor 10 continues to observe that moving object 20 as long as possible.

Therefore, for example, a constraint for reducing switching of the sensors 10 may be added to the allocation determination model. For example, such a constraint is expressed by the following Expression (6).

[Expression 6]

$$C_5 \sum_{n=1}^{Snum} \sum_{\alpha=1}^{Tnum} (px_{n,\alpha} - x_{n,\alpha})^2 \qquad (6)$$

C5 is a positive real number representing strength of the constraint. px_[n,α] represents a value of a previous x_[n,α]. Specifically, px_[n,α] represents whether the moving object 20-α has been allocated to a sensor 10-n in a previous time.

In Expression (6), (px_[n,α]–x_[n,α])^2 is 0 when there is no change in allocation of the moving object 20-α to the sensor 10-n, and is 1 when there is a change. Therefore, the smaller the change in the allocation of the moving object 20 is, the smaller a value of Expression (6) becomes. Therefore, by determining x_[n,α] in such a way that the value of Expression (6) becomes small, it is possible to reduce the change in the allocation of the moving object 20 to the sensor 10.

In other words, the larger a difference between the sensors 10 allocated to each of the moving objects 20 in a previous allocation and the sensors 10 allocated to each of the moving objects 20 in a current allocation is, the larger a value of a model including Expression (6) is. Meanwhile, as a difference between sensors allocated to each moving object in a previous allocation and sensors allocated to each moving object in a current allocation is smaller, the value of the model including Expression (6) is smaller. Therefore, by performing annealing processing on the model including Expression (6), it is possible to determine such an allocation that reduces the switching.

In addition, in order to reduce switching of the sensor 10, a constraint represented by the following Expression (7) may be used in addition to Expression (6) or in place of Expression (6).

[Expression 7]

$$C_6 \sum_{\alpha=1}^{Tnum} \left[ -\sum_{n=1}^{Snum} (x_{n,\alpha} * DB_{n,\alpha}) \right] \qquad (7)$$

C6 is a positive real number representing strength of the constraint. DB_[n,α] represents a predicted time (hereinafter, referred to as a tracking duration) during which sensor 10-n can continuously observe the moving object 20-α.

The tracking duration DB_[n,α] can be computed by estimating, for each of a plurality of time points in future, a position of the moving object 20-α at the time point, and determining whether the moving object 20 at the estimated position can be observed by the sensor 10-n. For example, it is assumed that a posture of the sensor 10 is controlled every second. Further, it is assumed that all of the moving objects 20-α at positions estimated for each time from 1 second later to t seconds later are at positions observable by the sensor 10-n. Further, it is assumed that the moving object 20-α at a position estimated t+1 seconds later is at a position where the sensor 10-n cannot observe. In this case, DB_[n,α]=t.

Herein, whether the moving object 20 at a particular position is observable by the sensor 10 can be determined by determining, for each posture of the sensor 10, whether the position is included in a sensing range of the sensor 10 in the posture. When there is a posture of the sensor 10 in which the position of the moving object 20 can be included in the sensing range, the moving object 20 at that position can be observed by the sensor 10. Meanwhile, when there is no posture of the sensor 10 in which the position of the moving object 20 can be included in the sensing range, the moving object 20 at that position cannot be observed by the sensor 10.

In other words, the longer duration of the sensor being allocated to each moving object is, the smaller a value of a model including Expression (7). Meanwhile, the shorter duration of the sensor being allocated to each moving object is, the larger the value of the model including Expression (7) is. Therefore, by performing annealing processing on the model including Expression (7), an advantageous effect of determining such an allocation that suppresses the switching is achieved.

Although the present invention has been described with reference to the example embodiment, the present invention is not limited to the above-described example embodiment. Various modifications that can be understood by a person skilled in the art may be made in the configuration and details of the present invention without departing from the scope of the present invention.

Note that, in the above-described example embodiment, the program may be stored and provided to a computer using various types of non-transitory computer-readable medium. The non-transitory computer-readable medium includes various types of tangible storage medium. Examples of the non-transitory computer-readable medium include magnetic recording media (e.g., flexible disks, magnetic tapes, hard disk drives), magneto-optical recording media (e.g., magneto-optical disks), CD-ROM, CD-R, CD-R/W, semi-conductor memories (e.g., mask ROM, programmable ROM (PROM), erasable PROM (EPROM), flash ROM, RAM). The program may also be provided to a computer by using various types of transitory computer-readable medium. Examples of the transitory computer-readable medium include electrical signals, optical signals, and electromagnetic waves. The transitory computer-readable medium can supply the program to the computer via a wired communication path such as an electric wire and an optical fiber, or a wireless communication path.

REFERENCE SIGNS LIST

10 SENSOR
20 MOVING OBJECT
30 ANNEALING MACHINE
40 REGION
500 COMPUTER
502 BUS
504 PROCESSOR
506 MEMORY
508 STORAGE DEVICE
510 I/O INTERFACE
512 NETWORK INTERFACE
2000 ALLOCATION DETERMINATION APPARATUS
2020 DETERMINATION UNIT
2040 EXECUTION CONTROL UNIT

What is claimed is:

1. An allocation determination apparatus comprising:
at least one memory storing instructions; and
at least one processor that is configured to execute the instructions to:
generate a model on which annealing is executed to allocate, for each of a plurality of moving objects, a sensor that observes the moving object from a plurality of the sensors based on a position of each one of the moving objects, wherein a value of the model is larger as a number of the moving objects that are not observed by any of the plurality of sensors is larger, and wherein a value of the model is smaller as the number of the moving objects that are not observed by any of the plurality of sensors is smaller;

wherein a direction in which the sensor can observe is divided into a plurality of sections, wherein the value of the model is larger as the section to be observed by the sensor is farther from the section being observed by the sensor, and wherein the value of the model is smaller as the section to be observed by the sensor is closer to the section being observed by the sensor.

2. The allocation determination apparatus according to claim 1, wherein the model includes variables that represent whether or not each of the moving objects is observed by the sensor, and wherein the annealing on the model is executed to determine values of the variables.

3. The allocation determination apparatus according to claim 1, wherein a direction in which the sensor can observe is divided into a plurality of sections, and wherein the value of the model is larger as a number of the sensors that are allocated to the moving object that is present in the section that is not observed by the sensor is larger.

4. The allocation determination apparatus according to claim 3, wherein the value of the model is smaller as a number of the sections observed by the sensor is closer to 1, and wherein the value of the model is larger as the number of the sections observed by the sensor is farther from 1.

5. The allocation determination apparatus according to claim 1, wherein the at least one processor is configured to further execute:

estimating a position of each of the moving objects at a time point at which allocation of the moving object being determined by the annealing is reflected; and reflecting the estimated position of each of the moving objects in the model.

6. The allocation determination apparatus according to claim 1, wherein the value of the model is larger as a difference between the sensors being allocated to each of the moving objects and the sensors to be allocated to each of the moving objects is larger, and wherein the value of the model is smaller as the difference is smaller.

7. The allocation determination apparatus according to claim 1, wherein the value of the model is smaller as duration of the sensors being allocated to the moving objects is longer while the value of the model is larger as the duration is shorter.

8. An allocation determination method, which is performed by a computer, comprising: generating a model on which annealing is executed to allocate, for each of a plurality of moving objects, a sensor that observes the moving object from a plurality of the sensors based on a position of each one of the moving objects, wherein a value of the model is larger as a number of the moving objects that are not observed by any of the plurality of sensors is larger, and wherein a value of the model is smaller as the number of the moving objects that are not observed by any of the plurality of sensors is smaller, wherein a direction in which the sensor can observe is divided into a plurality of sections, wherein the value of the model is larger as the section to be observed by the sensor is farther from the section being observed by the sensor, and wherein the value of the model is smaller as the section to be observed by the sensor is closer to the section being observed by the sensor.

9. A non-transitory computer-readable medium storing a program causing a computer to execute: generating a model on which annealing is executed to allocate, for each of a plurality of moving objects, a sensor that observes the moving object from a plurality of the sensors based on a position of each one of the moving objects, wherein a value of the model is larger as the number of the moving objects that are not observed by any of the plurality of sensors is larger, and wherein a value of the model is smaller as the number of the moving objects that are not observed by any of the plurality of sensors is smaller, wherein a direction in which the sensor can observe is divided into a plurality of sections, wherein the value of the model is larger as the section to be observed by the sensor is farther from the section being observed by the sensor, and wherein the value of the model is smaller as the section to be observed by the sensor is closer to the section being observed by the sensor.

10. The allocation determination method according to claim 8, wherein the model includes variables that represent whether or not each of the moving objects is observed by the sensor, and wherein the annealing on the model is executed to determine values of the variables.

11. The allocation determination method according to claim 8, wherein a direction in which the sensor can observe is divided into a plurality of sections, and wherein the value of the model is larger as a number of the sensors that are allocated to the moving object that is present in the section that is not observed by the sensor is larger.

12. The allocation determination method according to claim 11, wherein the value of the model is smaller as a number of the sections observed by the sensor is closer to 1, and wherein the value of the model is larger as the number of the sections observed by the sensor is farther from 1.

13. The allocation determination method according to claim 8, further comprising:

estimating a position of each of the moving objects at a time point at which allocation of the moving object being determined by the annealing is reflected; and reflecting the estimated position of each of the moving objects in the model.

14. The medium according to claim 9, wherein the model includes variables that represent whether or not each of the moving objects is observed by the sensor, and wherein the annealing on the model is executed to determine values of the variables.

15. The medium according to claim 9,
wherein a direction in which the sensor can observe is divided into a plurality of sections, and
wherein the value of the model is larger as a number of the sensors that are allocated to the moving object that is present in the section that is not observed by the sensor is larger.

16. The medium according to claim 15,
wherein the value of the model is smaller as a number of the sections observed by the sensor is closer to 1, and
wherein the value of the model is larger as the number of the sections observed by the sensor is farther from 1.

17. The medium according to claim 9, the program causes the computer to further execute:
estimating a position of each of the moving objects at a time point at which allocation of the moving object being determined by the annealing is reflected; and
reflecting the estimated position of each of the moving objects in the model.

* * * * *